(12) United States Patent
Jung et al.

(10) Patent No.: US 7,678,410 B2
(45) Date of Patent: Mar. 16, 2010

(54) DISPENSER FOR LIQUID CRYSTAL DISPLAY PANEL AND DISPENSING METHOD USING THE SAME

(75) Inventors: Sung-Su Jung, Daegu (KR); Yong-Keun Kwak, Gangwon-Do (KR)

(73) Assignee: LG Display Co., Ltd., Seoul (KR)

( * ) Notice: Subject to any disclaimer, the term of this patent is extended or adjusted under 35 U.S.C. 154(b) by 1354 days.

(21) Appl. No.: 10/727,570

(22) Filed: Dec. 5, 2003

(65) Prior Publication Data
US 2004/0131759 A1  Jul. 8, 2004

(30) Foreign Application Priority Data
Dec. 20, 2002  (KR) .................. 10-2002-0081903

(51) Int. Cl.
B05D 5/12 (2006.01)
B05D 5/00 (2006.01)
B05D 7/00 (2006.01)

(52) U.S. Cl. .................. 427/58; 427/256; 427/287; 427/427.3; 118/315

(58) Field of Classification Search ......... 118/313–315, 118/323; 427/424, 427.3, 256, 287
See application file for complete search history.

(56) References Cited

U.S. PATENT DOCUMENTS

| | | | |
|---|---|---|---|
| 3,978,580 A | 9/1976 | Leupp et al. | |
| 4,094,058 A | 6/1978 | Yasutake et al. | |
| 4,653,864 A | 3/1987 | Baron et al. | |
| 4,691,995 A | 9/1987 | Yamazaki et al. | |
| 4,775,225 A | 10/1988 | Tsuboyama et al. | |
| 5,247,377 A | 9/1993 | Omeis et al. | |
| 5,263,888 A | 11/1993 | Ishihara et al. | |
| 5,379,139 A | 1/1995 | Sato et al. | |
| 5,406,989 A | 4/1995 | Abe | |
| 5,499,128 A | 3/1996 | Hasegawa et al. | |
| 5,507,323 A | 4/1996 | Abe | |
| 5,511,591 A | 4/1996 | Abe | |
| 5,539,545 A | 7/1996 | Shimizu et al. | |
| 5,548,429 A | 8/1996 | Tsujita | |
| 5,642,214 A | 6/1997 | Ishii et al. | |
| 5,680,189 A | 10/1997 | Shimizu et al. | |
| 5,742,370 A | 4/1998 | Kim et al. | |
| 5,757,451 A | 5/1998 | Miyazaki et al. | |
| 5,852,484 A | 12/1998 | Inoue et al. | |
| 5,854,664 A | 12/1998 | Inoue et al. | |
| 5,861,932 A | 1/1999 | Inata et al. | |

(Continued)

FOREIGN PATENT DOCUMENTS

EP  1 003 066  5/2000

(Continued)

*Primary Examiner*—Timothy H Meeks
*Assistant Examiner*—Jimmy Lin
(74) *Attorney, Agent, or Firm*—McKenna Long & Aldridge LLP

(57) ABSTRACT

A dispenser for a liquid crystal display panel includes a substrate on which at least one image display is formed, a table on which the substrate having at least one image display part is loaded, and at least one syringe horizontally movable to change position in relation to the table for supplying a sealant on the substrate to form a seal pattern.

1 Claim, 5 Drawing Sheets

U.S. PATENT DOCUMENTS

| | | | |
|---|---|---|---|
| 5,875,922 | A | 3/1999 | Chastine et al. |
| 5,952,676 | A | 9/1999 | Sato et al. |
| 5,956,112 | A | 9/1999 | Fujimori et al. |
| 6,001,203 | A | 12/1999 | Yamada et al. |
| 6,011,609 | A | 1/2000 | Kato et al. |
| 6,016,178 | A | 1/2000 | Kataoka et al. |
| 6,016,181 | A | 1/2000 | Shimada |
| 6,055,035 | A | 4/2000 | von Gutfeld et al. |
| 6,163,357 | A | 12/2000 | Nakamura |
| 6,219,126 | B1 | 4/2001 | Von Gutfeld |
| 6,226,067 | B1 | 5/2001 | Nishiguchi et al. |
| 6,236,445 | B1 | 5/2001 | Foschaar et al. |
| 6,304,306 | B1 | 10/2001 | Shiomi et al. |
| 6,304,311 | B1 | 10/2001 | Egami et al. |
| 6,337,730 | B1 | 1/2002 | Ozaki et al. |
| 6,414,733 | B1 | 7/2002 | Ishikawa et al. |
| 2001/0013920 | A1* | 8/2001 | Hashimoto et al. .......... 349/187 |
| 2001/0021000 | A1 | 9/2001 | Egami |
| 2002/0018173 | A1 | 2/2002 | Furukawa et al. |
| 2002/0167634 | A1 | 11/2002 | Watanabe et al. |

FOREIGN PATENT DOCUMENTS

| | | |
|---|---|---|
| JP | 51-65656 | 6/1976 |
| JP | 57-38414 | 3/1982 |
| JP | 57-88428 | 6/1982 |
| JP | 58-27126 | 2/1983 |
| JP | 59-57221 | 4/1984 |
| JP | 59-195222 | 11/1984 |
| JP | 60-003609 | 1/1985 |
| JP | 60-111221 | 6/1985 |
| JP | 60-164723 | 8/1985 |
| JP | 60-179722 | 9/1985 |
| JP | 60-217343 | 10/1985 |
| JP | 61-7822 | 1/1986 |
| JP | 61-55625 | 3/1986 |
| JP | 62-89025 | 4/1987 |
| JP | 62-90622 | 4/1987 |
| JP | 62-205319 | 9/1987 |
| JP | 63-109413 | 5/1988 |
| JP | 63-110425 | 5/1988 |
| JP | 63-128315 | 5/1988 |
| JP | 63-311233 | 12/1988 |
| JP | 64-073323 * | 3/1989 |
| JP | 01-132197 | 5/1989 |
| JP | 03-094859 | 4/1991 |
| JP | 04-305265 | 10/1992 |
| JP | 5-127179 | 5/1993 |
| JP | 05-146732 | 6/1993 |
| JP | 5-154923 | 6/1993 |
| JP | 5-265011 | 10/1993 |
| JP | 5-281557 | 10/1993 |
| JP | 5-281562 | 10/1993 |
| JP | 05-023332 | 12/1993 |
| JP | 05-323332 | 12/1993 |
| JP | 6-51256 | 2/1994 |
| JP | 6-148657 | 5/1994 |
| JP | 6-160871 | 6/1994 |
| JP | 6-235925 | 8/1994 |
| JP | 6-265915 | 9/1994 |
| JP | 6-313870 | 11/1994 |
| JP | 7-84268 | 3/1995 |
| JP | 7-128674 | 5/1995 |
| JP | 7-181507 | 7/1995 |
| JP | 07-318952 | 12/1995 |
| JP | 8-95066 | 4/1996 |
| JP | 8-101395 | 4/1996 |
| JP | 8-106101 | 4/1996 |
| JP | 8-171094 | 7/1996 |
| JP | 8-190099 | 7/1996 |
| JP | 8-240807 | 9/1996 |
| JP | 9-5762 | 1/1997 |
| JP | 9-26578 | 1/1997 |
| JP | 9-61829 | 3/1997 |
| JP | 9-73075 | 3/1997 |
| JP | 9-73096 | 3/1997 |
| JP | 09-099268 | 4/1997 |
| JP | 9-127528 | 5/1997 |
| JP | 9-230357 | 9/1997 |
| JP | 9-281511 | 10/1997 |
| JP | 9-311340 | 12/1997 |
| JP | 10-107289 | 4/1998 |
| JP | 10-123537 | 5/1998 |
| JP | 10-123538 | 5/1998 |
| JP | 10-142616 | 5/1998 |
| JP | 10-177178 | 6/1998 |
| JP | 10-221700 | 8/1998 |
| JP | 10-240172 | 9/1998 |
| JP | 10-282512 | 10/1998 |
| JP | 10-296133 | 11/1998 |
| JP | 10-333157 | 12/1998 |
| JP | 10-333159 | 12/1998 |
| JP | 11-14953 | 1/1999 |
| JP | 11-38424 | 2/1999 |
| JP | 11-64811 | 3/1999 |
| JP | 11 064862 | 3/1999 |
| JP | 11-109388 | 4/1999 |
| JP | 11-133438 | 5/1999 |
| JP | 11-142864 | 5/1999 |
| JP | 11-174477 | 7/1999 |
| JP | 11-212045 | 8/1999 |
| JP | 11-248930 | 9/1999 |
| JP | 11-326922 | 11/1999 |
| JP | 11-344714 | 12/1999 |
| JP | 2000-2879 | 1/2000 |
| JP | 2000-29035 | 1/2000 |
| JP | 2000-56311 | 2/2000 |
| JP | 2000-66165 | 3/2000 |
| JP | 2000-137235 | 5/2000 |
| JP | 2000-147528 | 5/2000 |
| JP | 2000-193988 | 7/2000 |
| JP | 2000-241824 | 9/2000 |
| JP | 2000-284295 | 10/2000 |
| JP | 2000-292799 | 10/2000 |
| JP | 2000-310759 | 11/2000 |
| JP | 2000-310784 | 11/2000 |
| JP | 2000-338501 | 12/2000 |
| JP | 2001-5401 | 1/2001 |
| JP | 2001-5405 | 1/2001 |
| JP | 2001-13506 | 1/2001 |
| JP | 2001-33793 | 2/2001 |
| JP | 2001-42341 | 2/2001 |
| JP | 2001-51284 | 2/2001 |
| JP | 2001-66615 | 3/2001 |
| JP | 2001-91727 | 4/2001 |
| JP | 2001-117105 | 4/2001 |
| JP | 2001-117109 | 4/2001 |
| JP | 2001-133745 | 5/2001 |
| JP | 2001-133794 | 5/2001 |
| JP | 2001-133799 | 5/2001 |
| JP | 2001-142074 | 5/2001 |
| JP | 2001-147437 | 5/2001 |
| JP | 2001-154211 | 6/2001 |
| JP | 2001-166272 | 6/2001 |
| JP | 2001-166310 | 6/2001 |
| JP | 2001-183683 | 7/2001 |
| JP | 2001-201750 | 7/2001 |
| JP | 2001-209052 | 8/2001 |
| JP | 2001-209060 | 8/2001 |
| JP | 2001-215459 | 8/2001 |
| JP | 2001-222017 | 8/2001 |
| JP | 2001-235758 | 8/2001 |
| JP | 2001-255542 | 9/2001 |
| JP | 2001-264782 | 9/2001 |

| | | | | | | |
|---|---|---|---|---|---|---|
| JP | 2001-272640 | 10/2001 | | JP | 2002-107740 | 4/2002 |
| JP | 2001-281675 | 10/2001 | | JP | 2002-122872 | 4/2002 |
| JP | 2001-281678 | 10/2001 | | JP | 2002-122873 | 4/2002 |
| JP | 2001-282126 | 10/2001 | | JP | 2002-139734 | 5/2002 |
| JP | 2001-305563 | 10/2001 | | JP | 2002-202512 | 7/2002 |
| JP | 2001-330837 | 11/2001 | | JP | 2002-202514 | 7/2002 |
| JP | 2001-330840 | 11/2001 | | JP | 2002-214626 | 7/2002 |
| JP | 2001-356353 | 12/2001 | | JP | 2002-311439 | 10/2002 |
| JP | 2001-356354 | 12/2001 | | JP | 2002-346452 | 12/2002 |
| JP | 2002-14360 | 1/2002 | | JP | 2003-047899 | 2/2003 |
| JP | 2002-023128 | 1/2002 | | JP | 2004-030941 | 1/2004 |
| JP | 2002-23176 | 1/2002 | | JP | 2004-113910 | 4/2004 |
| JP | 2002-49045 | 2/2002 | | JP | 2004-163952 | 6/2004 |
| JP | 2002-079160 | 3/2002 | | JP | 2004-212976 | 7/2004 |
| JP | 2002-82340 | 3/2002 | | JP | 92134213 | 11/2004 |
| JP | 2002-90759 | 3/2002 | | KR | 2000-0035302 | 6/2000 |
| JP | 2002-90760 | 3/2002 | | | | |
| JP | 2002-098979 A * | 4/2002 | | * cited by examiner | | |

DISPENSER FOR LIQUID CRYSTAL DISPLAY PANEL AND DISPENSING METHOD USING THE SAME

This application claims the benefit of the Korean Application No. P2002-081903 filed on Dec. 20, 2002, which is hereby incorporated by reference.

BACKGROUND OF THE INVENTION

1. Field of the Invention

The present invention relates to a dispenser for a liquid crystal display panel and, more particularly, to a dispenser for a large scale liquid crystal display panel.

2. Discussion of the Related Art

In general, a liquid crystal display device is a display device where data signals according to picture information are individually supplied to liquid crystal cells arranged in a matrix form. Light transmittance of the liquid crystal cells is controlled in accordance with the data signals to display a desired picture. The liquid crystal display device includes a liquid crystal display panel where the liquid crystal cells are arranged in a matrix form, and a driver integrated circuit (IC) for driving the liquid crystal cells. The liquid crystal display panel includes a color filter substrate and a thin film transistor array substrate attached to each other. The liquid crystal display panel further includes a liquid crystal layer between the color filter substrate and the thin film transistor array substrate.

Data lines and gate lines are formed on the thin film transistor array substrate of the liquid crystal display panel and cross each other at right angles so as to define liquid crystal cells. The data lines transmit a data signal supplied from the data driver integrated circuit to the liquid crystal cells. The gate lines transmit a scan signal supplied from the gate driver integrated circuit to the liquid crystal cells. At an end portion of each of the data lines and the gate lines, a data pad and a gate pad are respectively provided in which data signals and scan signals are respectively applied from the data driver integrated circuit and the gate driver integrated circuit. The gate driver integrated circuit sequentially supplies a scan signal to the gate lines so that the liquid crystal cells arranged in the matrix form can be sequentially selected line by line while a data signal is supplied to the selected line of the liquid crystal cells from the data driver integrated circuit.

A common electrode and a pixel electrode are respectively formed on the inner side of the color filter substrate and the thin film transistor array substrate for applying an electric field to the liquid crystal layer of a liquid crystal cell. More particularly, a pixel electrode is respectively formed in each liquid crystal cell on the thin film transistor array substrate, while the common electrode is integrally formed across the entire surface of the color filter substrate. Therefore, by controlling a voltage applied to the pixel electrode while a voltage is applied to the common electrode, light transmittance of the liquid crystal cells can be individually controlled. To control the voltage applied to the pixel electrode by liquid crystal cells, a thin film transistor is formed in each liquid crystal cell and used as a switching device.

FIG. 1 is a plane view of the unit liquid crystal display panel formed by a thin film transistor array substrate and a color filter substrate according to the related art. As shown in FIG. 1, the liquid crystal display panel 100 includes an image display part 113 where the liquid crystal cells are arranged in a matrix form, a gate pad part 114 connected to the gate lines of the image display part 113, and a data pad part 115 connected to the data lines of the image display part 113. The gate pad part 114 and the data pad part 115 are formed along an edge region of the thin film transistor array substrate 101, which does not overlap with the color filter substrate 102. The gate pad part 114 supplies a scan signal from a gate driver integrated circuit (not shown) to the gate lines of the image display part 113, and the data pad part 115 supplies image information from a data driver integrated circuit (not shown) to the data lines of the image display part 113.

Data lines to which image information is applied and gate lines to which a scan signal is applied are provided on the thin film transistor array substrate 101. The data lines and the gate lines cross each other. Additionally, a thin film transistor for switching the liquid crystal cells is provided at each crossing of the data lines and the gate lines. A pixel electrode for driving the liquid crystal cells is connected to the thin film transistor and provided on the thin film transistor array substrate 101. A passivation film for protecting the pixel electrode and the thin film transistor is formed at the entire surface of the thin film transistor array substrate 101.

Color filters are provided on the color filter substrate 102 for each cell region. The color filters are separated by a black matrix. A common transparent electrode is also provided on the color filter substrate 102.

A cell gap is formed by a spacer between the thin film transistor array substrate 101 and the color filter substrate 102. A seal pattern 116 is formed along an outer edge of the image display part 113. The thin film transistor array substrate 101 and the color filter substrate 102 are attached by the seal pattern 116 to thereby form a unit liquid crystal display panel.

In fabricating the unit liquid crystal display panel, a method for simultaneously forming unit liquid crystal display panels on a large-scale mother substrate is generally used. Thus, a process is required for separating the unit liquid crystal display panels from the large-scale mother substrate. For example, a cutting process can be used on the mother substrate to separate the plurality of unit liquid crystal display panels formed thereon.

The seal pattern 116, as discussed above, has an opening. After the unit liquid crystal display panel is separated from the large-scale mother substrate, liquid crystal is injected through a liquid crystal injection opening to form a liquid crystal layer at the cell-gap, which separates the thin film transistor array substrate 101 and the color filter substrate 102. Then, the liquid crystal injection opening is sealed.

As mentioned above, the following steps are required to fabricate the unit liquid crystal display panel: the thin film transistor array substrate 101 and the color filter substrate 102 are separately fabricated on the first and second mother substrates, the first and second mother substrates are attached in such a manner that a uniform cell-gap is maintained therebetween, the attached first and second mother substrates are cut into unit panels, and then liquid crystal is injected to the cell-gap between the thin film transistor array substrate 101 and the color filter substrate 102. In particular, the process of forming the seal pattern 116 along an outer edge of the image display part 113 is required to attach the thin film transistor array substrate 101 and the color filter substrate 102. The related art process of forming a seal pattern will now be described.

FIGS. 2A and 2B illustrate a screen printing method to form a seal pattern. As shown in FIGS. 2A and 2B, there is provided a screen mask 206 patterned so that plural of seal pattern forming regions are selectively exposed. A rubber squeegee 208 is used to selectively supply a sealant 203 to the substrate 200 through the screen mask 206 so as to simultaneously form a plurality of seal patterns 216A-216F. The plurality of seal patterns 216A~216F formed on the substrate 200 create a gap in which liquid crystal layer is later injected and prevent leakage of the liquid crystal. Thus, the plurality of seal patterns 216A~216F are formed along each outer edge of the image display parts 213A~213F of the substrate 200 and liquid crystal injection openings 204A~204F are respectively formed for each of the seal patterns 216A~216F.

The screen printing method includes: applying the sealant 203 on the screen mask 206 with the seal pattern forming regions patterned thereon, forming the plurality of seal patterns 216A~216F on the substrate 200 through printing with the rubber squeegee 208; and evaporating a solvent contained in the seal patterns 216A~216F and leveling them. The screen printing method is widely used because it is an easy process. However, the screen printing method is disadvantageous in that sealant 203 is wasted because a lot of sealant is discarded after the squeegee 208 is drawn across the screen mask to form the plurality of seal patterns 216A~216F. In addition, the screen printing method has a problem in that rubbing of an orientation film (not shown) formed on the substrate 200 can incur defects when the screen mask 206 and the substrate 200 come into contact with each other. These defects will degrade picture quality of the liquid crystal display device.

To overcome the shortcomings of the screen printing method, a seal dispensing method has been proposed. FIG. 3 is an exemplary view of a related art dispensing method for forming a seal pattern. As shown in FIG. 3, while a table 310 with the substrate 300 loaded thereon is moved in forward/backward and left/right directions, a plurality of seal patterns 316A~316F are formed along each outer edge of image display parts 313A~313F on the substrate 300 by applying a predetermined pressure to syringes 301A~301C filled with a sealant. The seal patterns 316A~316F are sequentially formed for each line of the image display parts 313A~313F in a line by line fashion.

In the seal dispensing method, since the sealant is selectively supplied to the region where the seal patterns 316A~316F are to be formed, sealant waste is prevented. In addition, the syringes 301A~301C do not contact the orientation film (not shown) of the image display part 313 of the substrate 300 so that the rubbed orientation film will not be damaged. Thus, picture quality of the liquid crystal display device will be maintained.

As more image display parts 313A~313F are formed on the substrate 300, the more the fabrication yield and productivity improve. In order to form as many image display parts 313A~313F as possible on one substrate 300, the size of the substrate 300 is increased. However, the related art, in which the syringes 301A~301C are fixed while the table 310 with the substrate 300 loaded thereon is horizontally moved in forward/backward and left/right directions to form the seal patterns 316A~316F, has the following problems. First, as the liquid crystal display panel is enlarged, the area of the substrate 300 for fabrication of the large-scale liquid crystal display panel increases accordingly. In order to form the seal patterns 316A~316F on a large-scale substrate 300, the minimum distance that the table 310 needs to move is double the length of the shortest side of the substrate 300. Accordingly, if the dimensions of a substrate 300 are doubled, the size of the area that the table 310 needs to move about is increased by at least four times. Such an increase in the area for dispensing degrades the space use efficiency of a clean room. Second, because such a large mass of table 310 with the large-scale substrate 300 loaded thereon has to be moved in long forward/backward and left/right movements, more time is required to move the table 310 to accurately form the seal patterns 316A~316F, which degrades productivity.

SUMMARY OF THE INVENTION

Accordingly, the present invention is directed to a dispenser for a liquid crystal display panel and a dispensing method using the same that substantially obviates one or more of the problems due to limitations and disadvantages of the related art.

An object of the present invention is to provide a dispenser for a liquid crystal display panel that increases space use efficiency of a clean room.

Another object of the present invention is to provide a dispenser for a liquid crystal display panel that dispenses at a high speed on a large-scale liquid crystal display panel.

Another object of the present invention is to provide a dispenser for a liquid crystal display panel and a dispensing method using the same for forming a seal patterns on a substrate for liquid crystal display panels having different sizes.

To achieve these and other advantages and in accordance with the purpose of the present invention, as embodied and broadly described herein, there is provided a dispenser for a liquid crystal display panel including a substrate on which at least one image display is formed, a table on which the substrate having at least one image display part is loaded, and at least one syringe horizontally movable to change position in relation to the table for supplying a sealant on the substrate to form a seal pattern.

In another aspect, a dispensing method for a liquid crystal display panel includes loading a substrate having image display parts formed in a matrix of M lines×N columns thereon onto a table, and dispensing material onto the substrate using one of a N number and M number of syringes by moving the at least one syringe while the table is held in a fixed position.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

DETAILED DESCRIPTION OF THE ILLUSTRATED EMBODIMENTS

Reference will now be made in detail to the illustrated embodiments of the present invention, examples of which are illustrated in the accompanying drawings.

Figure 1:
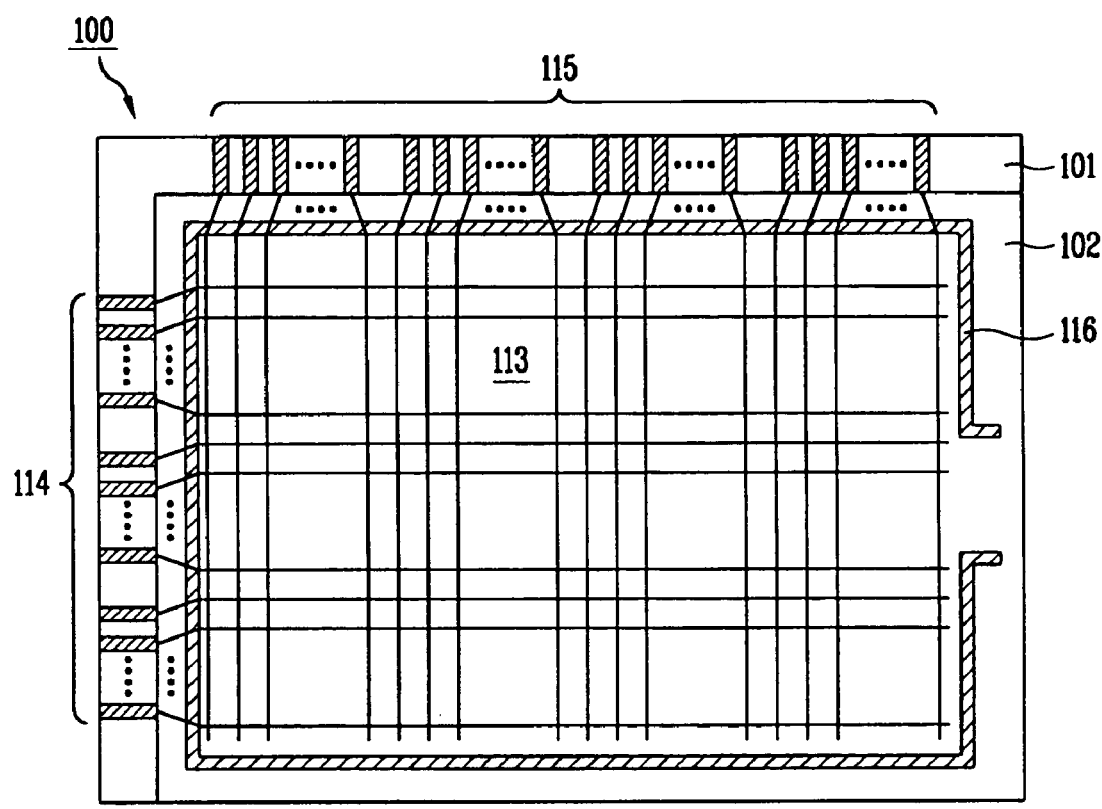
FIG. 1 is a plane view of the unit liquid crystal display panel formed by a thin film transistor array substrate and a color filter substrate according to the related art.
Figure 2A:
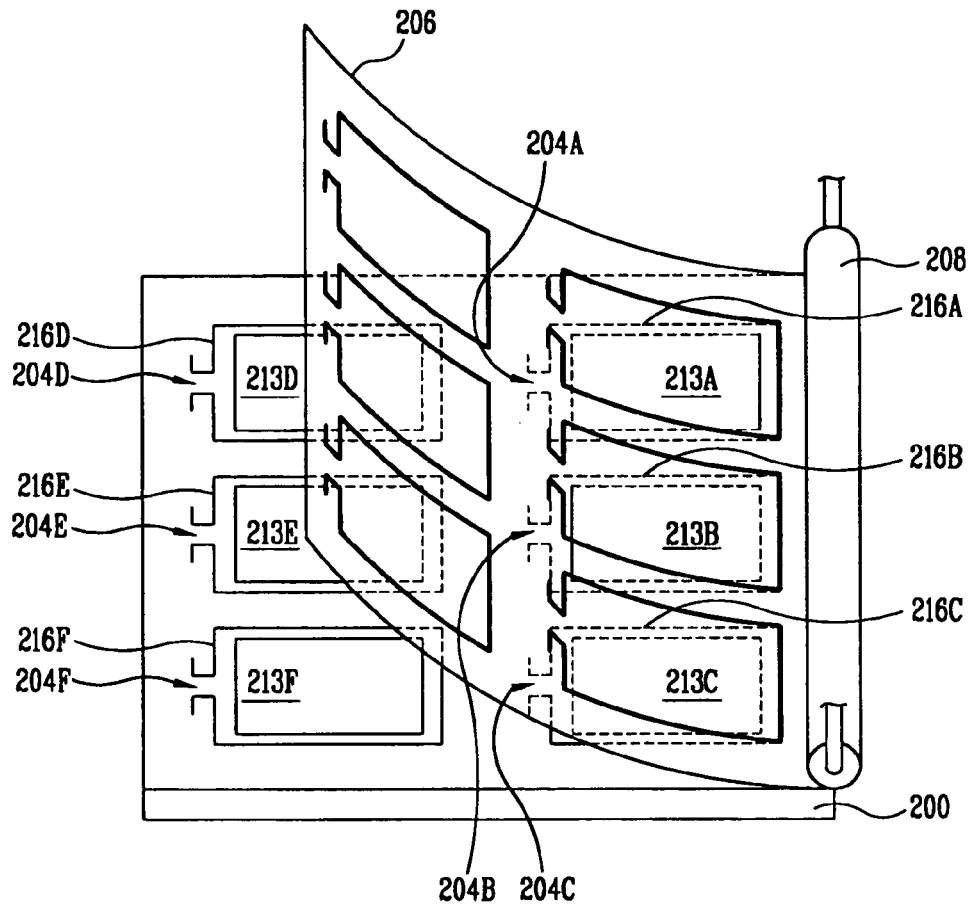
FIGS. 2A and 2B illustrate formation of a seal pattern through a screen printing method in accordance with the related art.
Figure 2B:
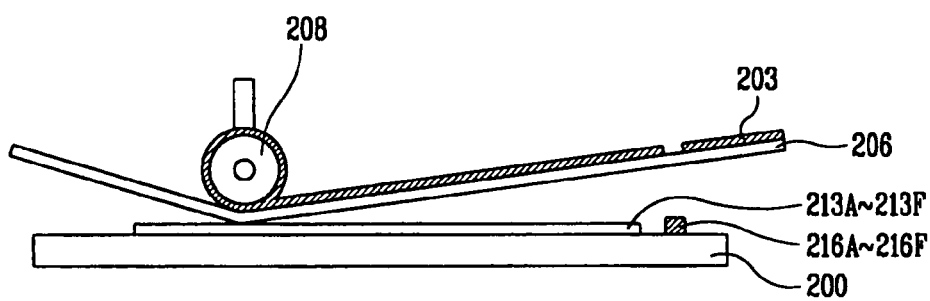
Figure 3:
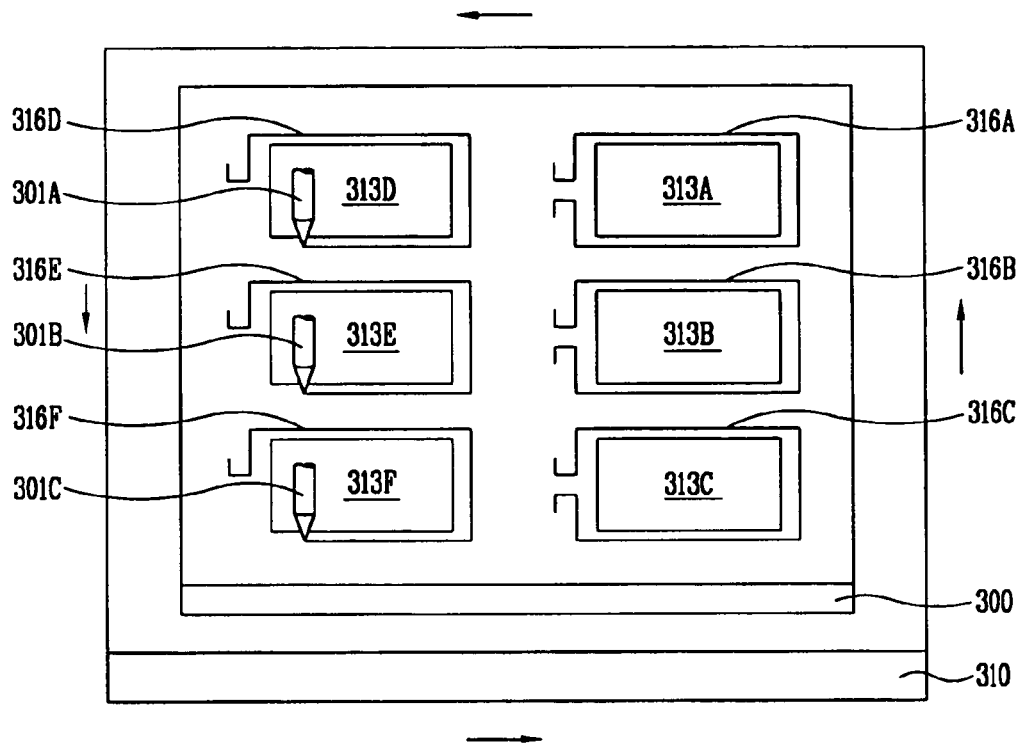
FIG. 3 illustrates formation of a seal pattern through a seal dispensing method in accordance with the related art.
Figure 4:
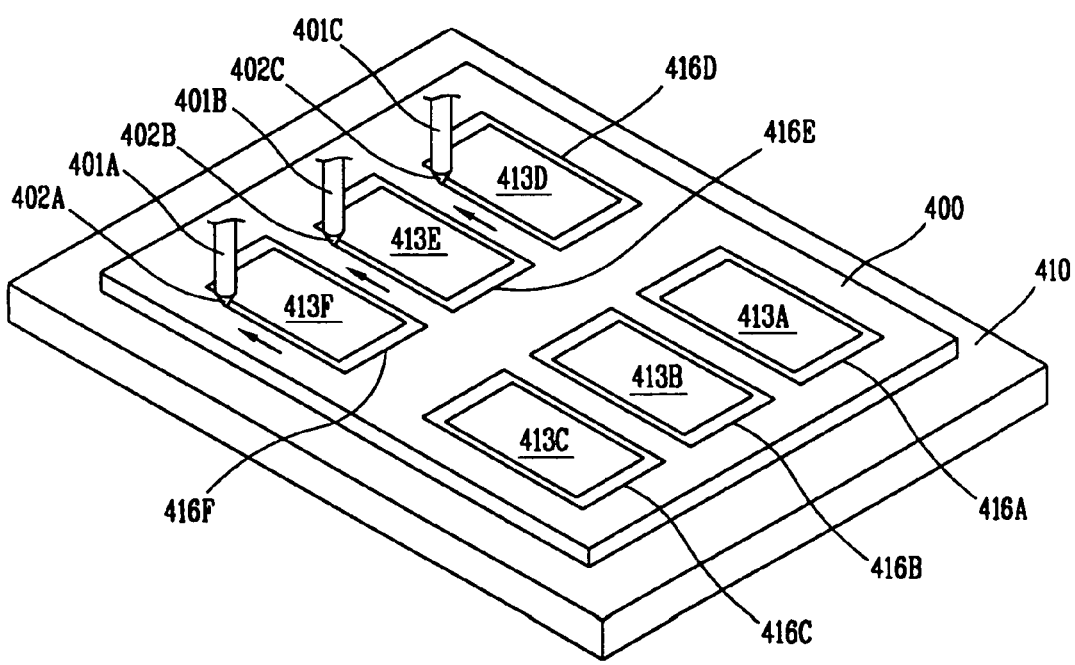
FIG. 4 illustrates a dispenser for a liquid crystal display panel in accordance with a first embodiment of the present invention.

FIG. 4 illustrates a dispenser for a liquid crystal display panel in accordance with a first embodiment of the present invention. As shown in FIG. 4, a dispenser for a liquid crystal display panel in accordance with the first embodiment of the present invention includes: a table 410 on which a substrate 400 including a plurality of image display parts 413A~413F is loaded onto and affixed thereon; and a plurality of syringes 401A~401C for applying a sealant along each outer edge of the image display parts 413A~413F on the substrate 400 to form a plurality of seal patterns 416A~416F while the substrate 400 is horizontally moved to change the syringes 401A~401C relative position to the table 410. The substrate 400 may be a large-scale first mother substrate formed of a glass material on which a plurality of thin film transistor array substrates are fabricated, or a large-scale second mother substrate formed of a glass material on which a plurality of color filter substrates are fabricated.

The syringes 401A~401C dispense the sealant along each outer edge of the image display parts 413A~413F of the substrate 400 through the nozzles 402A~402C provided at an end of each of the syringes 401A~401C to form the plurality of seal patterns 416A~416F. There can be as many syringes 401A~401C as there are image display parts 413A~413F on the substrate 400 so that the seal patterns 416A~416F can be simultaneously formed along each outer edge of the image display parts 413A~413F. For example, if there is M lines×N columns of display parts 413A~413M×N on the substrate 400, M line×N columns of syringes 401A~401M×N may be provided so that sealant is dispensed simultaneously for each image display parts 413A~413M×N. In the alternative, there can only be enough syringes 401A~401M×N provided that only correspond with at least one row or at least one column of the image display parts 413A~413M×N in the of M rows×N columns of display parts, and then repeatedly used to form the sealant pattern of each successive row or column.

In the case of there being as many syringes 401A~401C as there are image display parts 413A~413F, the syringes 401A~401M×N can all be moved simultaneously or each syringe can be moved individually. For example, the syringes 401A~401C move in forward/backward and left/right directions while supplying sealant to form the seal patterns 416A~416F along the outer edges of the image display parts 413A~413F of the substrate 400 in a column by column fashion, The table 410 on which the substrate 400 is loaded onto and affixed thereto is stationary. Thus, the movement of the syringes 401A~401C to form the seal patterns 416A~416F occurs within the area of the substrate 400. Accordingly, the area taken by the dispenser in a clean room is substantially the same as the area of the substrate 400. Thus, the space use efficiency of the clean room is minimally impacted as larger tables for larger substrates are used.

In the case of there being as many syringes 401A~401C as there are image display parts 413A~413F and the syringes 401A~401M×N are be moved simultaneously to apply sealant, the time taken for forming the seal patterns 416A~416M×N can be short. And, even though the area of the image display parts 413A~413M×N is changed according to a change in the model of the liquid crystal display or the area of the substrate 400 is increased, the dispenser and the dispensing method as described in the first embodiment can always form a plurality of sealant patterns in substantially the same amount of time as it takes to form another plurality of sealant patterns having a different size.

The patterns of the seal patterns 416A~416F formed by the dispenser for a liquid crystal display panel in accordance with the first embodiment of the present invention may differ according to the method for forming a liquid crystal layer on the liquid crystal display panel that will be subsequently used. The methods for forming a liquid crystal layer on the liquid crystal display panel can be divided into a vacuum injection method and a dropping method, which will now be described in detail.

First, the vacuum injection method begins with a unit liquid crystal display panel having a liquid crystal injection opening being separated from a large-scale mother substrate and positioned in a container filled with liquid crystal in a vacuum chamber. Then, liquid crystal is injected into the unit liquid crystal display panel according to a pressure difference between an inner side and an outer side of the unit liquid crystal display panel by varying a vacuum degree. After the liquid crystal is filled into the unit liquid crystal display panel, the liquid crystal injection opening is sealed to form the liquid crystal layer of the liquid crystal display panel. The liquid crystal injection opening in the vacuum injection method is defined as a region opened at each side of the seal patterns. Thus, in the case of forming a liquid crystal layer at the liquid crystal display panel through the vacuum injection method, the seal patterns are formed with each opened portion to function as a liquid crystal injection opening.

The vacuum injection method has the following problems. First, it takes a long time to fill liquid crystal into the liquid crystal display panel using the vacuum injection method. In general, the attached liquid crystal display panel with an area of several hundreds $cm^2$ has only a gap of a few μm. Thus, even with the vacuum injection method, which uses the pressure difference, the injection quantity of liquid crystal by unit time is naturally quite small. For instance, in the case of fabricating a liquid crystal display panel of about 15 inches, 8 hours are required to fill it with liquid crystal. Such a long time taken for fabrication of the liquid crystal display panel degrades productivity. As the size of liquid crystal display panel increase, the time required for filling liquid increases such that productivity further degrades. Therefore, the vacuum injection method does not readily cope with the fabrication of large-scale liquid crystal display panels.

Second, a lot of liquid crystal is consumed using the vacuum injection method. In general, the actual injected quantity of liquid crystal is very small compared to the amount of liquid crystal filled into the container. Liquid crystal degrades when exposed to air or to a specific gas. Thus, a large amount of liquid crystal remaining after filling has to be discarded, which increases the unit price of the liquid crystal display device so that price competitiveness of the product is weakened.

In order to overcome such problems of the vacuum injection method, the dropping method has been recently adopted. The dropping method is when liquid crystal is dispensed by dropping onto one of a large-scale mother substrate on which a plurality of thin film transistor array substrates are fabricated or onto another large-scale mother substrate on which color filter substrates is fabricated, and then the two mother substrates are attached to each other so that liquid crystal is uniformly distributed at the entire image display regions by the attaching pressure so as to form the liquid crystal layer. Unlike the vacuum injection method, the dropping method then proceeds with attaching the two mother substrates and separating unit liquid crystal display panels from the attached two mother substrates after the liquid crystal layer is formed.

Because liquid crystal is dropped directly onto the substrate, rather than being filled from outside, the seal patterns are formed in a closed pattern encompassing each outer edge of the image display parts to prevent leakage of liquid crystal to the outside. By using the dropping method, liquid crystal may be dropped within a short time compared to the vacuum injection method, and even though the liquid crystal display panel is large in size, the liquid crystal layer may be formed quickly. Price competitiveness is strengthened because the unit price of the liquid crystal display panel decreases compared to using the vacuum injection method since only the required amount of liquid crystal is dropped onto the substrate and thus the high-priced liquid crystal is not discarded.

In the case of adopting the dropping method, if the seal patterns 416A~416F are formed with a thermosetting sealant, the sealant may flow out during a follow-up process of attaching the liquid crystal display panel to contaminate the dropped liquid crystal. Thus, in the case adopting the dropping method, the seal patterns 416A~416F can be formed with an ultraviolet (UV) hardening sealant. In the alternative, the seal patterns 416A~416F may be formed with a mixture of the ultraviolet hardening sealant and the thermosetting sealant.

The dispenser for a liquid crystal display panel in accordance with the first embodiment of the present invention may also be adopted to forming seal patterns for liquid crystal display panels on a substrate where the liquid crystal display panels have different sizes. Typically, manufacturers use one size of substrate but make different sizes of liquid crystal display panels. Accordingly, there will be situations where liquid crystal display panels of a first size are formed on the substrate and there is an area left over where additional liquid crystal display panels of the first size will not fit. This results in the left over area being discarded. However, the dispenser for a liquid crystal display panel in accordance with the first embodiment of the present invention can be used to form seal patterns of liquid crystal display panels of a second size smaller than the first size, as well as to form seal patterns for the liquid crystal display panels of the first size so as to improve use efficiency of the substrate.

Figure 5A:
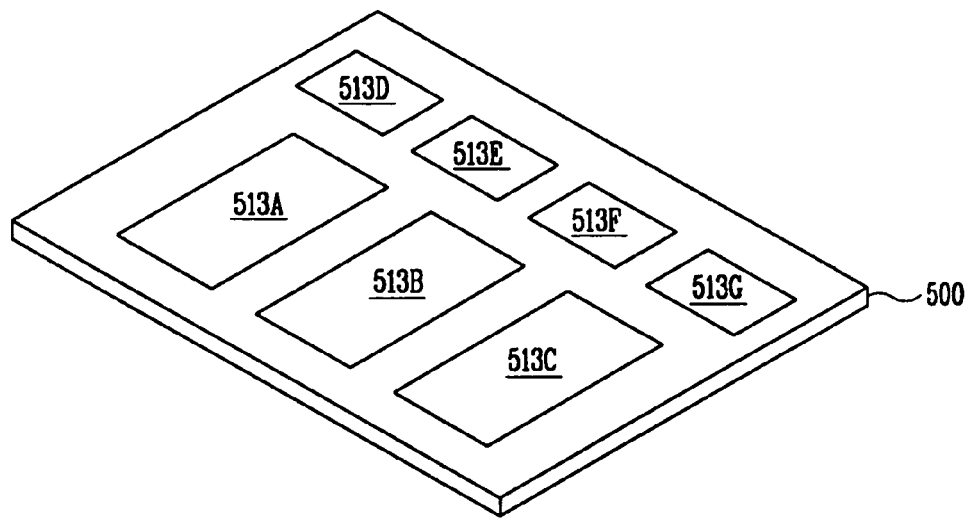
FIGS. 5A to 5D sequentially show a dispensing method using the dispenser for a liquid crystal display panel in accordance with a second embodiment of the present invention.

The method of fabricating liquid crystal display panels with different sizes on the substrate will now be described in detail with reference to FIGS. 5A to 5D that sequentially show a second embodiment of the present invention. As shown in FIG. 5A, image display parts 513A~513C with a first size and image display parts 513D~513G with a second size are formed on the substrate 500. As mentioned above, in the case of forming only the image display parts 513A~513C with the first size on the substrate 500, the area where the image display parts 513D~513G with the second size are shown would have been discarded such that use efficiency of the substrate 500 would have been degraded. Thus, by forming the image display parts 513D~513G with the second size smaller than the first size on the area of the substrate 500 that otherwise would have been discarded, use efficiency of the substrate is maximized.

Figure 5B:
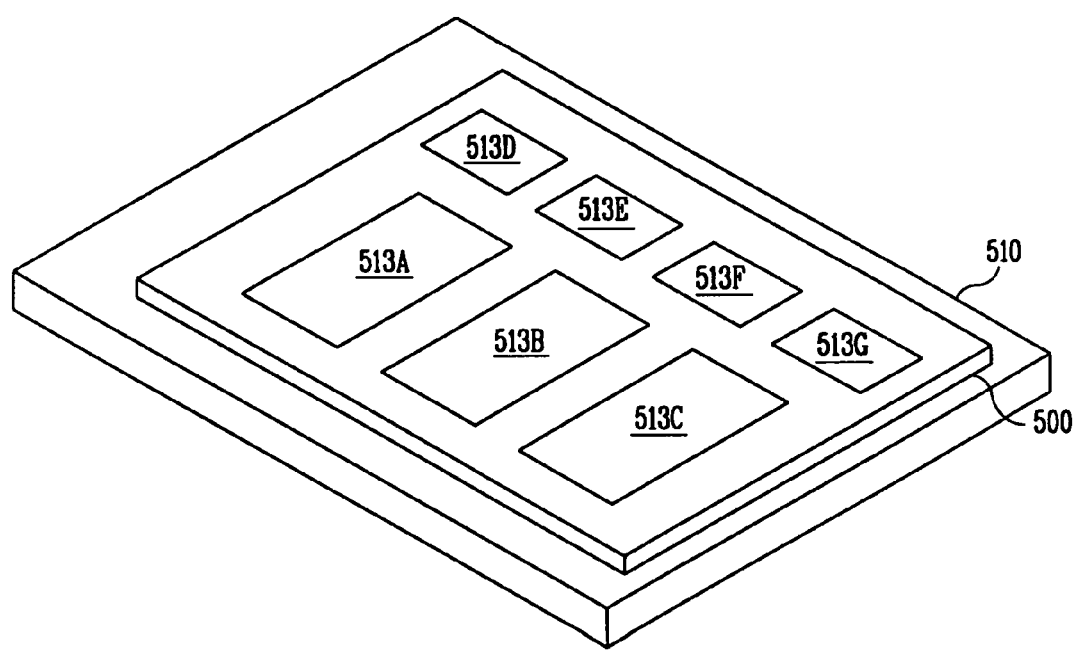
Figure 5C:
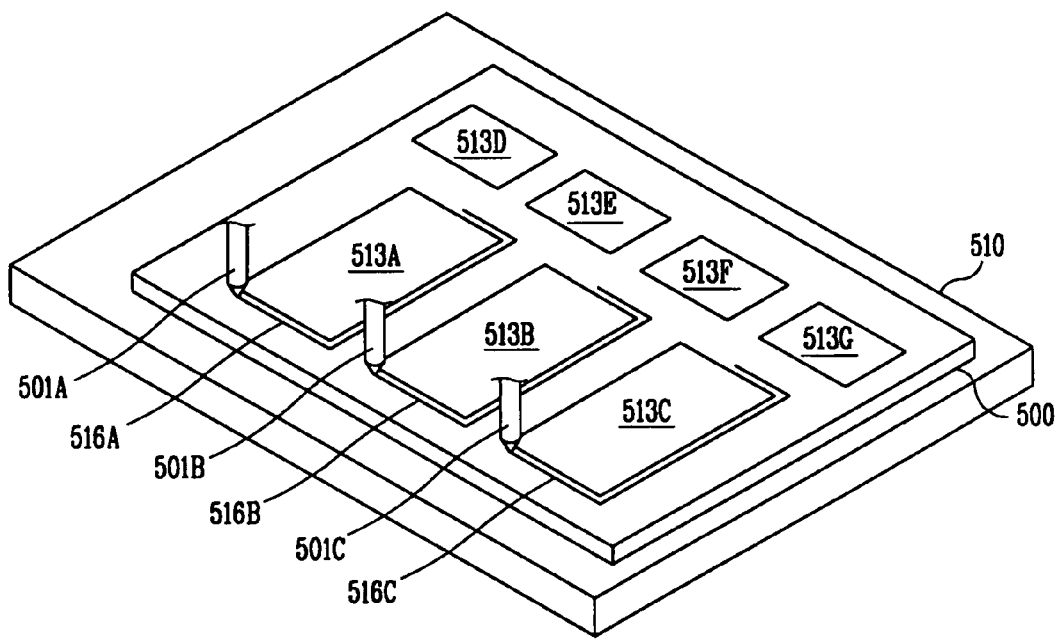
Figure 5D:
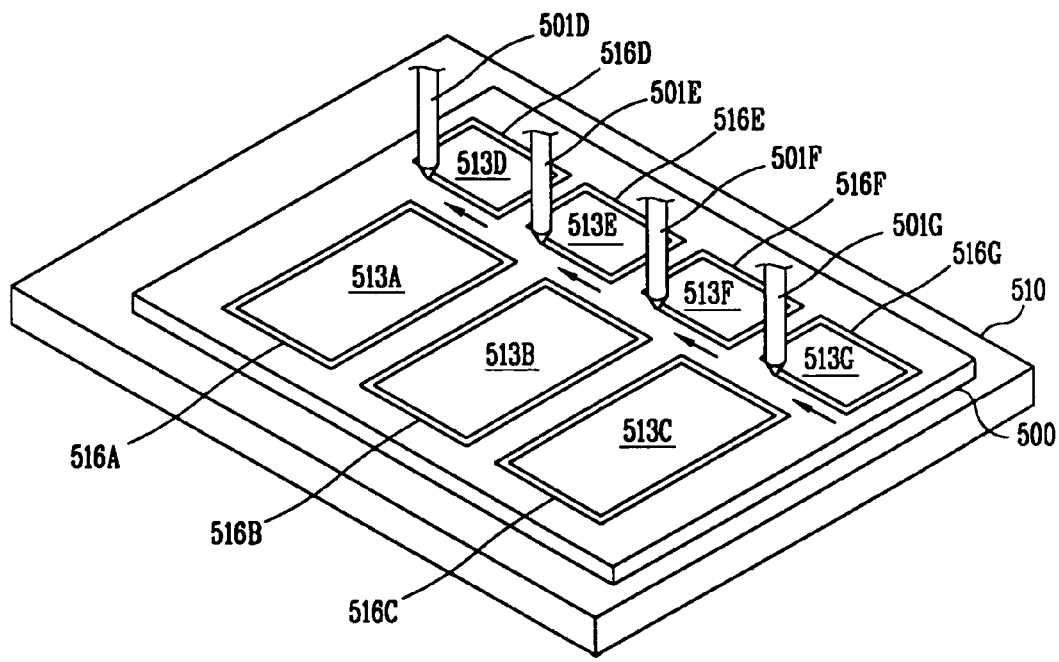

With reference to FIG. 5B, the substrate 500 with the image display parts 513A~513C of the first size and the image display parts 513D~513G of the second size are loaded and fixed on the table 510. Then, as shown in FIG. 5C, the sealant is supplied along each outer edge of the image display parts 513A~513C of the first size on the substrate 500 while the syringes 501A~501C are horizontally moved together in forward/backward and left/right directions, to thereby form the seal patterns 516A~516C. And then, as shown in FIG. 5D, the sealant is supplied along each outer edge of the image display parts 513D~513G of the second size on the substrate 500 while the syringes 501D~500G are horizontally moved together in forward/backward and left/right directions, to thereby form the seal patterns 516D~516G. In the alternative, the syringes can be moved individually or in other sub-groups to form the seal patterns for different sizes of images display parts.

As described above, the dispenser for a liquid crystal display panel in accordance with the second embodiment of the present invention effectively copes with forming seal patterns for image display parts having different sizes. In the second embodiment of the present invention, the substrate is loaded and fixed on a table. The first seal patterns are formed along the outer edges of the image display parts of the first size, and then the second seal patterns are formed along the outer edges of the image display parts of the second size.

As so far described, the dispenser for a liquid crystal display panel of the present invention, the syringes are driven to form the seal patterns on the substrate, which loaded on and fixed to the table. Therefore, even if the area of the substrate is increased, the space taken by the dispenser for a liquid crystal display panel in accordance with the present invention is minimized so as to improve space use efficiency of the clean room. In addition, time required for forming the seal patterns can be shortened and different sizes of sealant patterns can be formed in the same amount of time so that productivity can be improved. Further, the dispenser for a liquid crystal display panel in accordance with the present invention can form seal patterns of different sizes.

It will be apparent to those skilled in the art that various modifications and variations can be made in the dispenser for liquid crystal display panel of the present invention without departing from the spirit or scope of the inventions. Thus, it is intended that the present invention covers the modifications and variations of this invention provided they come within the scope of the appended claims and their equivalents.

What is claimed is:

1. A dispensing method for a liquid crystal display panel, comprising:

loading a substrate having of plurality of image display parts formed in a matrix form having two lines or columns onto a table, each line or column including a plurality of image display parts having the same size and the size of the image display part in one line or column is different from that in the other line or column; and dispensing sealant onto the image display parts in one line or column by simultaneously operating a plurality of syringes while the table is held in a fixed position;

dispensing sealant onto the image display parts in the other line or column by simultaneously operating a plurality of syringes while the table is held in a fixed position, wherein the number of the syringes for each line or column corresponds to the number of the image display parts in each line or column.

\* \* \* \* \*